United States Patent [19]

Backlund

[11] Patent Number: 4,494,976
[45] Date of Patent: Jan. 22, 1985

[54] FERTILIZERS CONTAINING NITROGEN AND MICRONUTRIENTS

[75] Inventor: Peter S. Backlund, Anaheim, Calif.

[73] Assignee: Union Oil Company of California, Los Angeles, Calif.

[21] Appl. No.: 471,452

[22] Filed: Mar. 7, 1983

Related U.S. Application Data

[63] Continuation of Ser. No. 259,067, Apr. 30, 1981, abandoned.

[51] Int. Cl.$^3$ .............................................. C05C 9/00
[52] U.S. Cl. ...................................... 71/28; 71/64.02; 71/64.07; 71/64.12; 427/212; 564/63
[58] Field of Search ............... 71/28, 64.12, 64.2, 71/64.7, 904; 260/555 C; 427/212; 564/63, 3

[56] References Cited

U.S. PATENT DOCUMENTS

| | | | |
|---|---|---|---|
| 2,074,880 | 3/1937 | Whittaker et al. | 260/125 |
| 3,070,435 | 12/1962 | Reusser et al. | 71/64 |
| 3,423,199 | 1/1969 | Philan et al. | 427/212 |
| 3,533,776 | 10/1970 | Coates et al. | 71/28 |
| 3,617,239 | 11/1971 | Kanica et al. | 71/28 |
| 3,684,476 | 8/1972 | Wadsted | 71/28 |
| 3,867,124 | 2/1975 | Church | 71/1 |
| 3,936,501 | 2/1976 | Greidinger | 564/63 |
| 3,941,578 | 3/1976 | Tucker et al. | 71/28 |
| 3,976,467 | 8/1976 | Seferian et al. | 71/28 |
| 3,981,713 | 9/1976 | Tucker et al. | 71/28 |
| 4,026,695 | 5/1977 | Young | 71/27 |
| 4,026,696 | 5/1977 | Young | 71/28 |
| 4,028,088 | 6/1977 | Young et al. | 71/28 |
| 4,073,633 | 2/1978 | Young | 71/28 |
| 4,249,930 | 2/1981 | Atkisson | 71/28 |

FOREIGN PATENT DOCUMENTS 7739014 12/1977 Japan .

OTHER PUBLICATIONS

Chem. Abstracts 50:2432a, 1956, Cosma.
C. W. Whittaker, F. O. Lundstrom, and S. B. Hendricks, "Reaction Between Urea and Gypsum", *Ind. and Eng. Chem.* 25 (11), pp. 1280–1282, (1933).
Japan Patent 7739014, as abstracted in *Central Patents Index*, Section E, Derwent Publications, Ltd., London, Week Y43, (Dec. 14, 1977).

*Primary Examiner*—Kenneth M. Schor
*Attorney, Agent, or Firm*—Robert A. Franks; Dean Sandford; Gregory F. Wirzbicki

[57] ABSTRACT

Metal oxides are applied to the surface of urea particles and chemically bonded to the urea by a heat-induced reaction. The product of this reaction is a free-flowing, relatively nonhygroscopic nitrogenous chemical fertilizer. By selecting metal oxides corresponding to a particular soil deficiency, beneficial micronutrients can be supplied simultaneously with nitrogen. Other materials, such as elemental sulfur, can be incorporated into the metal oxides prior to coating or can be liquefied and applied as a separate additional coating to the metal oxide-urea particles. In another embodiment, fertilizer particles are coated with metal oxides, covered with molten urea, and heated to induce a reaction. The formed reaction product remains as a layer on the exterior of the particle.

7 Claims, No Drawings

FERTILIZERS CONTAINING NITROGEN AND MICRONUTRIENTS

This application is a continuation, of application Ser. No. 259,067, filed Apr. 30, 1981, now abandoned.

BACKGROUND OF THE INVENTION

1. Field of the Invention

This invention relates to solid, particulate fertilizers, and more particularly to solid, particulate, nitrogen-base fertilizers containing micronutrients and to their method of manufacture.

2. Description of the Prior Art

For many decades, urea has been used in large quantities as a fertilizer material. Its relative popularity over other forms of plant-available nitrogen results from the fact that, in many localities, it is the least expensive source of nitrogen. In addition, urea has the highest nitrogen content of any solid fertilizer material, so that smaller quantities can be applied to a given plot of land to achieve a desired level of available nitrogen.

Urea for fertilizer use is ordinarily marketed in the form of prills. Prilling produced a free flowing, non-dusting material which is easily handled and applied to the soil with spreaders normally used on farms. Upon prolonged storage, however, the relatively soft, hygroscopic urea prills tend to agglomerate and cake into large masses. Due to this tendency, the urea is frequently packaged in water-repellent, multi-layered bags for protection from atmospheric moisture, but caking is still noted after the bags have remained stacked during the usual warehouse storage.

Various procedures have been devised for decreasing the caking properties of urea prills, including the application of coating agents. The usual coating process has consisted of dusting the prills or otherwise admixing the prills with coating powder. Powders used have included various silica compositions and silicates, diatomaceous earth, clays and several inorganic minerals. Such coatings, however, have not proven to be entirely satisfactory due to the rather loose adhesion obtained. During handling, a significant portion of the coating becomes dislodged, leaving surfaces of the prill unprotected against caking.

To overcome this deficiency, non-powder coatings such as molten sulfur, oils, urea-formaldehyde mixtures, or molten organic compositions (e.g., waxes, bitumen and the like) have been applied to urea. The result has generally been a significant improvement in anti-caking properties and, depending upon the specific coating used, the attainment of slow-release characteristics for the urea, but accompanied by a sharp increase in product price. Such coated products have therefore been of practical use mostly for crops which have a high profit margin or in home gardening uses.

One further approach has been that of "encapsulating" the urea inside an inorganic shell, such as in U.S. Published application No. B 141,968 to Kawar. Particles are coated with a metal oxide or hydroxide (e.g., calcium oxide or calcium hydroxide) and the coated material is exposed to carbon dioxide, forming a low-porosity coating of metal carbonate.

Other workers have devised systems wherein coatings are applied which are capable of reaction with the urea particle, which reaction will form a relatively more impervious or lesser caking composition at the surface of the prill. Much of this effort has been with the hydrated metal sulfates, as in U.S. Pat. No. 2,074,880 to Whittaker et al. (gypsum—$CaSO_4 \cdot 2H_2O$) and also in U.S. Pat. No. 3,867,124 to Church ($FeSO_4 \cdot 7H_2O$, $MgSO_4 \cdot 7H_2O$, $CuSO_4 \cdot 5H_2O$), which describes the coating of ammonium nitrate particles with the reaction product of urea and the metal sulfate hydrate. According to these patents, the water of crystallization in the metal sulfate is replaced by urea, yielding a liquid product which forms the coating. Drying is then needed to remove the displaced water molecules.

Another method for coating fertilizer particles is that of Wadsted in U.S. Pat. No. 3,684,476, whereby dolomite is selectively calcined to form a material having from one to five moles of calcium carbonate per mole of magnesium oxide. Urea is reacted with this material, in the solid phase, to give magnesium dicarbamide and some magnesium carbamide, which coats a fertilizer particle. Calcium carbonate attaches to the reaction product, forming a protective layer.

As a labor-saving consideration, it is frequently desirable to simultaneously apply major nutrients, such as nitrogen, and micronutrients, such as trace metals, to crop-growing land. Tucker et al., in U.S. Pat. Nos. 3,941,578 and 3,981,713 describe two methods for combining urea with zinc oxide. The former method consists of simply coating urea particles with very finely divided zinc oxide powder, reportedly suffering to a lesser degree from the previously noted adhesion problems, which result in caking of the urea and separation of the ingredients. The latter method involves dissolving zinc oxide into molten urea, giving a good dispersion of the micro-nutrient but not significantly affecting the caking tendencies of urea.

The previously noted processes for reacting urea with hydrated metal sulfates also may be viewed as describing the incorporation of micronutrients into fertilizers, insofar as iron and copper are useful in promoting the growth of plants.

A need remains, however, for coated, non-caking urea fertilizer particles which are prepared by bonding micronutrient oxides to the particles, using a method which does not involve a lengthy drying step.

Accordingly, it is an object of the present invention to provide urea particles which are protected against caking by a surface layer composed of a relatively hard, micronutrient-containing product of the reaction between urea and one or more metal oxides.

A further object is to provide solid fertilizer particles having a core of materials other than urea, upon which a surface layer is composed of a micronutrient-containing product of the reaction between urea and one or more metal oxides.

It is also an object of the invention to prepare the aforementioned particles by an uncomplicated method which can utilize simple equipment common to the fertilizer industry.

An additional object is the preparation of coated, non-caking urea particles by a method which does not require a drying step for the product.

These and other objects will more clearly appear from consideration of the following description and examples.

SUMMARY OF THE INVENTION

In accordance with the invention, there is provided a relatively non-caking, micronutrient-containing nitrogenous fertilizer composition, and a method for its preparation which comprises the steps of applying a coating of at least one metal oxide to urea particles, and heating the coated particles to effect a reaction between the metal oxide and urea. The resulting fertilizer particles are characterized by the presence of a urea core surrounded by a layer of higher hardness material comprising the solid-state reaction product of the metal oxides and urea.

Metal oxides which can be used include, without limitation, those of manganese, iron, copper, zinc, cobalt and the like. Mixtures of metal oxides can be used. It is also possible to incorporate other plant nutrient or soil amendment materials, such as elemental sulfur, into the fertilizer particle by mixing the additive material with the metal oxide prior to the coating operation. Alternatively, low melting point additives such as sulfur can be applied to the coated particles, prepared by the practice of this invention, to form an additional protective layer.

Another embodiment of the process which has the potential for a higher throughput of product, due to a shorter time of heating, comprises the steps of applying a coating of at least one metal oxide to solid fertilizer particles and covering the coated particles with molten urea, which will react with the metal oxide to form a layer of reaction product. This embodiment is useful for urea and fertilizer materials other than urea, such as other particulate nitrogen materials (ammonium nitrate or urea-ammonium nitrate mixtures) and nitrogen-phosphorus compositions, either with or without potassium.

DESCRIPTION OF THE INVENTION

The objects of this invention, and other important benefits, are achieved by a process which comprises the steps of (a) applying a coating of at least one metal oxide to urea particles; and (b) heating the coated particles to effect a reaction between the metal oxide and urea.

Urea particles which can be utilized in the process include all forms which are customarily marketed, such as, without limitation, crystalline, granulated and prilled urea. Prilling is a quite common method for preparing solid urea, and is also the preferred material for practicing the process of this invention, due to the fact that the relatively smooth surface of a prill facilitates the application of a more uniform, continuous coating.

The term "micronutrients", as used herein, encompasses all plant nutrient elements other than the generally accepted macronutrients (nitrogen, phosphorus and potassium), including without limitation, calcium, magnesium, sulfur, iron, manganese, copper, zinc, boron, cobalt, molybdenum and the like.

Metal oxides which are useful in the process of the instant invention include oxides of the micronutrients as defined, supra. The metal oxides can be used singly or in combination, depending upon the objectives to be served by the final composition. For example, molybdenum is ordinarily used in much smaller amounts than are other micronutrients, and it would not be desirable to prepare urea particles coated with only molybdenum, since the required amount of this metal could be too small for adequate coating of the particles. In this instance, it would be preferable to disperse molybdenum oxide in another metal oxide, such as that of zinc or iron (which are utilized by plants at much higher rates), and then coat the particulate urea with the mixed oxides.

The micronutrient sulfur, although usually not considered to be a metal, can nonetheless be incorporated into the coated particles of this invention. This can be accomplished by adding a desired amount of finely divided elemental sulfur, up to about 50 percent by weight, to the metal oxide or mixture of metal oxides, prior to coating the urea particles.

As an alternate method of providing particles which contain sulfur, coated particles can be sprayed with molten sulfur to form an additional outer layer comprising sulfur. Benefits derived from the procedure include a decreased rate of urea dissolution in water, higher mechanical strength of the finished product, and an enhanced rate of metal solubilization due to formation of an acidic environment in soil around the particle from the bacterial conversion of sulfur to sulfuric acid. These benefits, however, are accompanied by a large increase in product cost, limiting the market available for such products.

The method of this invention can be carried out in conventional pan and drum granulators and fluidized bed dryers which are common in the fertilizer industry. Pan granulators, also known as inclined-pan or disk agglomerators, are basically inclined (from the horizontal) rotating disks with rims to contain the charged material. The incline angle is typically capable of adjustment, and rotation is normally obtained by use of electric motors, which can be of the variable-speed type. In operation, the material to be agglomerated is introduced to the pan and allowed to tumble, with appropriate additions of liquid (usually water) to promote particle adhesion, until rounded particles of the required size form in sufficient quantities to discharge over the pan lip. These particles can then be passed over a sieve, which can have openings of about 16 mesh for the purposes of this invention, and the fine material passing through the sieve can be returned to the pan.

Drum granulators are inclined (from the horizontal) rotating cylinders, usually deriving rotational energy from variable-speed motor drives, in which introduced material tumbles as it moves from the higher elevation inlet end to the lower elevation outlet end of the cylinder. Operation of the devices is similar to that of pan granulators, including the addition of liquid and recycle of fine material from the product.

Product particle size, shape and porosity can be altered in either type of granulator by alterations in the liquid content, retention time and rotational speed. With soluble materials such as urea, however, it is more desirable to limit the amount of water addition, and increase agglomerated particle size by utilizing slower rotational speeds and smaller inclination angles.

For particular applications requiring elevated temperatures, heat can be supplied to either type of granulator. Pan granulators can be heated by placing one or more burners under the pan and adjusting the burner flame to obtain a desired amount of heating. Pan and drum granulator contents can be heated by impinging heated gases, such as heated air or gases from combustion, upon the inner surfaces of the granulator.

The method of this invention is well suited for use in a urea plant. In a presently preferred embodiment, the method comprises mixing fertilizer grade urea prills or granules with dry powdered metal oxide in a screw conveyor, using the proper ratios of ingredients to provide the desired amount of metal oxide in the final product. This mixture is then allowed to fall into a rotating pan granulator, which is heated by burners located below the pan. Additional heat is applied directly to the mixture by means of hot gases, to maintain the temperature of the pan contents between about 100° C. and about 130° C. (212° F. to 266° F.). A spray of water, in an amount of about 0.5 percent to about five percent by weight of the metal oxide-urea mixture, is added to the mixture to promote adhesion of the metal oxide. Product discharge from the pan is passed over a sieve, which removes fine material for recycle to the pan, and is then cooled to below about 50° C. (122° F.) before being placed in storage.

If it is desired to further coat the particles with sulfur, product discharge from the pan is diverted onto a second pan granulator, where it is sprayed with molten sulfur to provide the desired thickness of sulfur coating. After cooling, the particles can be sent to storage. As a more simple alternative, molten sulfur can be sprayed on coated particles as they are discharged from pan or drum granulators, or from fluidized bed dryers. This obviates the need for an additional piece of equipment.

An alternate method for practicing the invention comprises mixing solid fertilizer particles with metal oxide powder, in a device such as a screw conveyor, and allowing the mixture to fall into a heated rotating pan granulator. A spray of molten urea is applied to the mixture, and the pan discharge is passed over a sieve or sent to a second pan granulator for coating with molten sulfur. Among the advantages for this alternative is the lessened requirement for heating the urea-metal oxide mixture while it is present on the granulating pan.

This alternate method is not limited to urea particles, since the major coating-forming reaction occurs externally to the particle between the metal oxide and molten urea. For this reason, the particles can be any of the commercially available fertilizers, including, without limitation, nitrogen materials such as ammonium nitrate or urea-ammonium nitrate mixtures, nitrogen-phosphorus compositions with or without potassium values, and the like.

When carrying out the method of this invention, a reaction occurs at the urea-metal oxide interface, by which the metal oxide combines with urea to form a metal dicarbamide and water. Small amounts of the metal carbamide are also thought to form from a side reaction. The reaction is believed to proceed as exemplified by the following equations:

$$ZnO + 2(NH_2)_2CO \rightarrow Zn(NHCONH_2)_2 + H_2O \quad (1)$$

$$Fe_2O_3 + 2(NH_2)_2CO \rightarrow Fe_2O_2(NHCONH_2)_2 + H_2O \quad (2)$$

Prolonged heating is not required to promote the reaction. Thermal analyses of metal oxide-urea mixtures show that a readily apparent reaction is generally obtained at about 50° C., becoming more rapid as the temperature is increased up to the melting point of urea, about 133° C. For maximum production efficiency, temperatures between about 90° C. and the melting point of the materials are preferred.

Exact residence times in process equipment depend upon the nature of the equipment, particle bed thickness, temperature, etc., but have been determined to be about five to ten minutes for zinc oxide or ferric oxide coated urea in a laboratory size (12 inch) pan granulator heated to about 110° C.

Coating thickness can be varied over a wide range to produce products of a desired composition. The coating should cover the surface of a urea particle as completely as possible for maximum anti-caking effect. As a practical matter, the coated product should not have a diameter greatly exceeding twice the diameter of the starting urea particle, to obtain acceptable coating adhesion.

Actual weights of the added metal oxide will depend upon the density of the metal oxide powders used, and can range up to about 40 percent by weight of the starting urea particle.

If an additional outer coating of sulfur is desired, the sulfur content of the finished product will be between about 5 percent and about 20 percent by weight.

The metal oxide-coated particles of this invention have been found to possess a very high resistance to caking during storage. Resistance to increased moisture content during storage in high humidity atmospheres can be improved by adding a coating of sulfur to the particles. Particles of urea which are coated only with metal oxide absorb moisture much the same as uncoated urea, but exhibit much less tendency to cake when damp. Metal oxide coating also usually increases the resistance to crushing of urea particles.

The invention is further illustrated by the following examples which are illustrative of various aspects of the invention, and are not intended as limited the scope of the invention as defined by the appended claims. In the examples, all percentages are expressed on a weight basis.

EXAMPLE 1

In an experiment to determine the stoichiometry of metal oxide-urea reactions, the finely divided compounds are intimately mixed, in the proportion of 1 mole metal oxide to slightly more than 2 moles urea. The mixture is heated to initiate a reaction and maintained at an elevated temperature, below the melting point of urea. Water which forms forms during the reaction (according to the equations noted, supra) is determined by measuring weight loss. Results are as shown in Table I.

TABLE I

| Metal Oxide | Heating Temperature, °C. | Moles H₂O Lost per Mole of Oxide |
|---|---|---|
| ZnO | 110 | 1 |
| Fe₂O₃ | 120 | 1 |
| Mn₂O₃ | 120 | ½ |
| Mn₃O₄ | 120 | ½ |
| Fe₃O₄ | 120 | ½ |
| CuO | 120 | ½ |
| MnO₂ | 120 | no reaction* |
| Cu₂O | 120 | no reaction* |

*Ammonia loss at 127° C.

These results exemplify the diverse nature of oxide materials which can be reacted with urea in the practice of the invention.

EXAMPLE 2

Coated particles of urea are prepared by mixing urea prills with metal oxide. A 500 gram portion of the mixture is poured onto a 12 inch laboratory rotating pan granulator, which is preheated by burners and heated air to about 110° C. Rotation and heating are continued for about 10 minutes, while the particles are heating to about 110° C., and for about 5 minutes thereafter. After cooling to room temperature, a portion of the coated urea is passed through sieves to separate particles larger than 10 mesh, but smaller than 8 mesh, for testing.

Tests of the coated particles include analysis for moisture, metal and nitrogen content, crushing strength, and increase in moisture content after exposure to an atmosphere of 81 percent relative humidity for 48 hours. Results are as shown in Table II.

TABLE II

| Metal Oxide | Moisture, % | Metal, % | Nitrogen % | Crushing Strength p.s.i. | Absorbed $H_2O$, % |
|---|---|---|---|---|---|
| ZnO | 0.03 | 3.2 | 42.6 | 482 | 5.4 |
| ZnO | 0.07 | 7.4 | 41.6 | 451 | 7.7 |
| $Fe_2O_3$ | 0.06 | 4.5 | 43.2 | 494 | 4.6 |
| $Fe_2O_3$ | 0.05 | 9.1 | 40.5 | 419 | 7.5 |
| $Fe_3O_4$ | 0.06 | 2.0 | 43.8 | 508 | 6.7 |
| CuO | 0.11 | 1.6 | 44.6 | 532 | 6.6 |
| $Mn_3O_4$ | 0.04 | 2.5 | 44.2 | 577 | 7.1 |
| $Mn_2O_3$ | 0.06 | 1.7 | 43.7 | 597 | 7.7 |
| (None) | 0.15 | — | 46.0 | 469 | 7.9 |

These results exemplify the types of oxide materials which successfully coat urea particles by the practice of this invention, and a wide range of coating amounts which can be used.

EXAMPLE 3

Coated urea particles are prepared as in Example 2, except that about 15 grams of water are sprayed onto the 500 gram charge in the pan granulator. Better adherence of metal oxide coatings is noted, resulting in a slightly decreased time for complete urea-metal oxide reaction. The final coated particles have properties substantially equivalent to those shown in Table II.

EXAMPLE 4

Coated urea particles are prepared as in Example 2, heated to about 105° C. and sprayed with sufficient molten sulfur at about 150° C. to constitute about 10 percent of the final product. Similar tests are again conducted on product having a size larger than 10 mesh, but smaller than 8 mesh, with the results as shown in Table III.

TABLE III

| Metal Oxide | Metal % | Nitrogen, % | Sulfur % | Crushing Strength, p.s.i. | Absorbed $H_2O$, % |
|---|---|---|---|---|---|
| ZnO | 2.9 | 39.2 | 10 | 471 | 5.7 |
| ZnO | 6.7 | 37.1 | 10 | 469 | 5.6 |
| $Fe_2O_3$ | 4.1 | 38.9 | 10 | 417 | 5.8 |
| $Fe_2O_3$ | 8.2 | 36.5 | 10 | 355 | 4.9 |
| (None) | — | 41.4 | 10 | 513 | 6.1 |
| (None) | — | 46 | (None) | 413 | 9.4 |

The data indicate the improved properties which are obtained through the application of an additional coating of sulfur to metal oxide-coated particles.

EXAMPLE 5

Coated particles are prepared through an alternate method, by mixing urea prills with metal oxide and heating the mixture, as in Example 2, to about 105° C. Molten urea is sprayed onto the mixture in a sufficient amount to constitute about 10 percent of the final product. After cooling, particles having a size larger than 10 mesh, but smaller than 8 mesh, are tested as in Example 2, yielding the results shown in Table IV.

TABLE IV

| Metal Oxide | Metal % | Nitrogen % | Crushing Strength p.s.i. | Absorbed $H_2O$, % |
|---|---|---|---|---|
| ZnO | 2.9 | 43.0 | 532 | 5.6 |
| ZnO | 6.7 | 41.9 | 496 | 7.8 |
| $Fe_2O_3$ | 4.1 | 43.4 | 533 | 5.0 |
| $Fe_2O_3$ | 8.2 | 41.3 | 463 | 7.7 |

These results indicate that coated particles having properties very similar to those shown in Table II can be prepared using the alternate method.

Various embodiments and modifications of this invention have been described in the foregoing description and examples, and further modification will be apparent to those skilled in the art. Such modifications are included within the scope of the invention as defined by the following claims.

I claim:

1. A method for producing free-flowing nitrogenous chemical fertilizer particles, containing micronutrients, comprising the steps of:
   (a) coating urea particles with a metal-containing component consisting essentially of powdered oxides of one or more metals selected from the group consisting of iron, zinc, manganese, molybdenum, copper, boron, and cobalt;
   (b) heating the coated particles for a time and at a temperature below the melting point of urea so as to effect a condensation reaction between the metal-containing component of the coating and the urea in the coated particle; and
   (c) recovering a particulate product without drying, the particles being resistant to caking and crushing, and having urea nitrogen and micronutrient which are readily plant available.

2. The method defined in claim 1 wherein urea is selected from the group consisting of urea prills, urea granules, and crystalline urea.

3. The method defined in claim 1 wherein elemental sulfur is added to the oxides prior to application of the coating to the urea particles.

4. The method defined in claim 1 wherein the coated particles are heated to a temperature below about 130° C.

5. The method defined in claim 4 wherein the coated particles are heated to a temperature between about 90° C. and 130° C.

6. The method defined in claim 1 further comprising the step of (d) applying an additional coating of molten sulfur to the coated particles.

7. A particulate chemical fertilizer prepared according to the method of claim 1.

* * * * *